United States Patent
Lim et al.

(10) Patent No.: US 7,773,524 B2
(45) Date of Patent: Aug. 10, 2010

(54) APPARATUS AND METHOD FOR USING AUTOMATIC REPEAT REQUEST SCHEME IN A BROADBAND WIRELESS ACCESS COMMUNICATION SYSTEM

(75) Inventors: Geun-Hwi Lim, Seongnam-si (KR);
Joon-Ho Park, Seongnam-si (KR);
Bo-Kyung Wang, Yongin-si (KR); Yong Chang, Seongnam-si (KR)

(73) Assignee: Samsung Electronics Co., Ltd (KR)

( * ) Notice: Subject to any disclaimer, the term of this patent is extended or adjusted under 35 U.S.C. 154(b) by 697 days.

(21) Appl. No.: 11/708,691

(22) Filed: Feb. 20, 2007

(65) Prior Publication Data
US 2007/0214399 A1 Sep. 13, 2007

(30) Foreign Application Priority Data
Feb. 17, 2006 (KR) .................. 10-2006-0015820

(51) Int. Cl.
*G01R 31/08* (2006.01)
*G06F 11/00* (2006.01)
*H04L 12/28* (2006.01)
*H04L 12/56* (2006.01)
*G08C 25/02* (2006.01)

(52) U.S. Cl. .............. 370/236; 370/394; 714/748
(58) Field of Classification Search ............ None
See application file for complete search history.

(56) References Cited

U.S. PATENT DOCUMENTS

| 7,020,822 | B2 * | 3/2006 | Ho et al. ............... 714/748 |
| 2002/0080719 | A1 * | 6/2002 | Parkvall et al. ........ 370/235 |
| 2005/0163161 | A1 * | 7/2005 | Wei et al. .............. 370/469 |
| 2005/0276266 | A1 * | 12/2005 | Terry .................... 370/394 |

FOREIGN PATENT DOCUMENTS

| KR | 1020030004618 | 1/2003 |
| KR | 1020030004978 | 1/2003 |
| WO | WO 03/105394 | 12/2003 |

\* cited by examiner

*Primary Examiner*—Chirag G Shah
*Assistant Examiner*—Ashley L Shivers
(74) *Attorney, Agent, or Firm*—The Farrell Law Firm, LLP

(57) ABSTRACT

An apparatus and method for using an Automatic Repeat reQuest (ARQ) in a Broadband Wireless Access (BWA) communication system are provided. In a transmitting method of a wireless communication system, a Media Access Control (MAC) layer creates a packet and transmits it to a physical layer, the physical layer generates a Hybrid ARQ (HARQ) burst using the packet received from the MAC layer and transmits it, the physical layer generates a HARQ ending signal and transmits it to the MAC layer when HARQ transmission of the packet is discontinued, and the MAC layer drives an ARQ retransmission timer for the packet in response to the HARQ ending signal.

23 Claims, 11 Drawing Sheets

APPARATUS AND METHOD FOR USING AUTOMATIC REPEAT REQUEST SCHEME IN A BROADBAND WIRELESS ACCESS COMMUNICATION SYSTEM

PRIORITY

This application claims priority under 35 U.S.C. §119 to an application filed in the Korean Intellectual Property Office on Feb. 17, 2006 and assigned Serial No. 2006-15820, the contents of which are incorporated herein by reference.

BACKGROUND OF THE INVENTION

1. Field of the Invention

The present invention relates generally to an apparatus and method for using an Automatic Repeat reQuest (ARQ) in a Broadband Wireless Access (BWA) communication system, and in particular, to an apparatus and method for efficiently using an ARQ retransmission timer of a Media Access Control (MAC) layer.

2. Description of the Related Art

Research is being actively conducted to provide services with various QoS (Quality of Service) at a transmission speed of about 100 Mbps in the 4th Generation (4G) communication system, which is a next-generation communication system. In particular, the research has evolved to guarantee the mobility of and the QoS of the existing Broadband Wireless Access (BWA) communication systems, such as a wireless Local Area Network (LAN) system and a wireless Metropolitan Area Network (MAN) system. A representative example of the BWA communication systems is the IEEE (Institute of Electrical and Electronics Engineers) 802.16 communication system.

For a physical channel, the BWA communication systems, such as the IEEE 802.16 communication system, have employed the Orthogonal Frequency Division Multiplexing/Orthogonal Frequency Division Multiple Access scheme (hereinafter, the "OFDM/OFDMA" scheme).

During wireless data communication, an error may occur in particular data, depending on the channel state of a radio resource section. Techniques of controlling and restoring data caused by such an error may be largely categorized into the ARQ (Automatic Repeat reQuest) technique and the FEC (Forward Error Check) technique. The ARQ technique is used to request retransmission of data that is lost during transmission to a receiver, and the FEC technique is used to correct an error in data that occurs during transmission to a receiver.

In particular, in the ARQ technique, a result of error detection for packets received by a receiver, e.g., a CRC (Cyclic Redundancy Check) result, must be fed back to a sender. First, when the sender initially transmits the packets, the receiver receives and decodes the packets. In this case, if an error does not occur, the receiver transmits an ACK signal to the sender. If an error occurs, the receiver transmits a NACK signal to the sender. Then, the sender retransmits the transmitted packets or transmits new packets, depending on whether the receiver transmits the ACK signal or the NACK signal.

The BWA communication system employs two retransmission methods for reliable data transmission. One of the methods is the MAC (Media Access Control) ARQ method employed by the MAC layer, and the other method is the HARQ (Hybrid ARQ) method employed by a physical (PHY) layer. In general, the MAC ARQ method requires 50 to 80 ms as to perform data retransmission once, but the HARQ method is capable of rapidly performing data retransmission within 10 to 30 ms. That is, in the HARQ method, it is possible to perform data retransmission several times for a short period of time by minimizing the amount of time for the sender to spend waiting for an ACK signal, thereby increasing the rate of data transmission.

However, an ACK/NACK signal when using the HARQ method is less reliable than when using the MAC ARQ method, thus lowering the reliability of data transmission. Also, the HARQ method does not guarantee the sequence of transmitted data, since a retransmission window is not available. In contrast, the MAC ARQ method guarantees reliable data transmission and the sequence of transmitted data. For this reason, in general, the HARQ method and the MAC ARQ method are used together.

FIG. 1 illustrates the format of a Packet Data Unit (PDU) of a MAC layer in a conventional BWA communication system.

As illustrated in FIG. 1, the PDU 107 of the MAC layer, which is transmitted in a radio section, has a format in which a generic MAC header 101 is added before a payload field 103, and an optional CRC (Cyclic Redundancy Check) field 105 is added after the payload field 103. Thus, data is retransmitted in units of PDUs during an ARQ mode.

FIG. 2 is a state transition diagram of an ARQ of a MAC layer in a conventional BWA communication system.

As illustrated in FIG. 2, the states of the ARQ include a "not sent" state 200, an "outstanding" state 202, a "wait for retransmission" state 204, a "discarded" state 206, and a "done" state 208.

Referring to FIG. 2, first, when a packet (a MAC PDU) is transmitted in the "not sent" state 200, the MAC layer transmits to the "outstanding" state 202 in order to drive an ARQ retransmission timer. If a NACK message is received from a receiver or a predetermined retransmission timer ends in the "outstanding" state 202, the MAC layer transmits to the "wait for retransmission" state 204. The MAC layer that transmits to the "wait for retransmission" state 204 retransmits the packet, and transmits to the "outstanding" state 202 again.

The MAC layer transmits to the "done" state 208 when an ACK message is received from the receiver in the "wait for retransmission" state 204, and transmits to the "discarded" state 206 when data retransmission continuously fails and a predetermined lifetime ARQ_BLOCK_LIFETIME expires. When the ACK message is received from the receiver in the "outstanding" state 202, the MAC layer transmits to the "done" state 208. Also, when the lifetime ARQ_BLOCK_LIFETIME expires in the "outstanding" state 202, the MAC layer transmits to the "discarded" state 206 so as to discard the packet. When the ACK message is received from the receiver in the "discarded" state 206, the MAC layer transmits to the "done" state 208.

As described above, the MAC layer of a sender transmits an ARQ block, and then waits for an ACK message to be fed back from the receiver. In this case, when the ACK message is normally received, control of data retransmission for the ARQ block is discontinued, but the ARQ block is retransmitted when the retransmission timer expires before the ACK message is received. Also, when data retransmission fails continuously and the lifetime of the ARQ block expires, the ARQ block is discarded.

In general, a period of time that the MAC layer of the sender stands by so as to receive an ACK message after transmitting data, is referred to as "the ARQ retransmission timer". The ARQ retransmission timer is used to determine an instance of time when data retransmission will be performed when a transmission error occurs, and thus significantly influences the ARQ retransmission performance. The ARQ retransmission timer must be set to a minimum value within a range that guarantees a sufficient time for the receiver to transmit an ARQ response. In detail, the ARQ retransmission timer is determined in consideration of a delay time of transmission of data from the sender to the receiver, a length of time that the receiver spends receiving the data and preparing an ARQ response therefor, and a delay time of transmission of the ARQ response from the receiver to the sender. Since a delay time of transmission is very short when using only the ARQ of the MAC layer, the retransmission timer is determined by the length of time that the receiver spends preparing a response. In this case, the retransmission timer is approximately several tens msec. However, when the ARQ is used together with a HARQ, an additional transmission delay occurs due to retransmission of the HARQ, and thus, the ARQ retransmission timer of the MAC layer must be determined in consideration of a maximum delay time of retransmission of the HARQ. For example, when a maximum number of times that the HARQ can be transmitted is 3, a delay time of transmission due to retransmission of the HARQ is greater than or equal to 100 msec. Therefore, the ARQ retransmission timer of the MAC layer must be set to be greater than or equal to 100 msec.

As described above, when the MAC ARQ method and the HARQ method are used together, the ARQ retransmission timer of the MAC layer must be set in consideration of a delay in retransmission of the HARQ of a lower physical layer. If the ARQ retransmission timer is set to be significantly long in consideration of retransmission of the HARQ, retransmission delay is increased greatly. In contrast, when the ARQ retransmission timer is set to be short, the MAC layer may perform unnecessary retransmission, which will now be described in detail.

FIG. 3 illustrates a conventional case where data retransmission is delayed due to an ARQ retransmission timer of a MAC layer.

Referring to FIG. 3, a MAC PDU generated by the MAC layer of a sender is transmitted to a receiver via a physical layer PHY. The physical layer PHY of the receiver determines whether an error has occurred in received data HARQ Burst, and transmits a negative response HARQ-NACK to the sender when it is determined that an error has occurred. However, when an error occurs in the HARQ-NACK and a positive response HARQ-ACK is transmitted to the sender, the physical layer PHY of the sender determines that the HARQ is normally transmitted and thus does not retransmit the data HARQ Burst. In this case, the MAC layer of the receiver does not receive the MAC PDU and thus cannot transmit an ACK signal. Accordingly, the MAC layer of the sender waits until an ARQ retransmission timer expires, and retransmits the MAC PDU. As a result, retransmission of the ARQ of the MAC layer is significantly delayed since the retransmission timer is set to be long in consideration of retransmission of the HARQ. In this case, the average rate of transmission is degraded.

FIG. 4 illustrates a conventional case where data is unnecessarily retransmitted due to an ARQ retransmission timer of a MAC layer.

Referring to FIG. 4, a MAC PDU generated by the MAC layer of a sender is transmitted to a receiver via a physical layer PHY. The physical layer PHY of the receiver determines whether an error has occurred in received data HARQ Burst, and transmits a negative response HARQ-NACK to the sender when it is determined that an error has occurred. The physical layer PHY of the sender, which receives the negative response HARQ-NACK, retransmits the data HARQ Burst to the receiver. If the receiver normally receives the data HARQ Burst after the data HARQ Burst is retransmitted several times, the physical layer PHY of the receiver transmits a positive response HARQ-ACK to the sender, and the received MAC PDU to an upper MAC layer. Then, the MAC layer of the receiver determines whether an error has occurred in the received MAC PDU and transmits a positive response ARQ-ACK to the MAC layer of the sender when it is determined that the MAC PDU is normally received.

As described above, when transmission of the MAC PDU is delayed due to continuous data retransmission of the physical layer, the ARQ response from the MAC layer is also delayed. In this case, if the ARQ retransmission timer of the sender is not sufficiently long, the ARQ retransmission timer expires before the transmitter receives the ARQ response from the receiver, and therefore, the MAC layer of the sender unnecessarily retransmits the MAC PDU to the receiver. That is, although the MAC PDU is normally transmitted, the sender mistakenly determines that a transmission error has occurred and thus retransmits the MAC PDU unnecessarily, since the ARQ retransmission timer is short.

SUMMARY OF THE INVENTION

An aspect of the present invention is to substantially solve at least the above problems and/or disadvantages and to provide at least the advantages below. Accordingly, an aspect of the present invention is to provide an apparatus and method for efficiently using an Automatic Repeat reQuest (ARQ) retransmission timer of a Media Access Control (MAC) layer in a Broadband Wireless Access (BWA) communication system.

Another aspect of the present invention is to provide an apparatus and method for receiving the state of a lower physical layer and using an ARQ retransmission timer of a MAC layer, in a BWA communication system.

Another aspect of the present invention is to provide an apparatus and method for increasing the rate of data transmission when a MAC ARQ and a Hybrid ARQ (HARQ) are used together in a BWA communication system.

Another aspect of the present invention is to provide an apparatus and method for preventing a MAC layer from unnecessarily retransmitting data when a MAC ARQ and a HARQ are used together in a BWA communication system.

According to one aspect of the present invention, there is provided a transmission method of a MAC (Media Access Control) layer in a wireless communication system, the method including determining whether a HARQ (Hybrid Automatic Repeat reQuest) ending signal is generated by a physical layer after transmission of a packet; and driving an ARQ retransmission timer for the packet when the HARQ ending signal is generated.

According to another aspect of the present invention, there is provided a transmission method of a wireless communication system, the method including a MAC (Media Access Control) layer generating a packet and transmitting it to a physical layer; the physical layer creating a HARQ (Hybrid Automatic Repeat reQuest) burst using the packet received from the MAC layer, and transmitting the HARQ burst; when HARQ transmission for the packet is discontinued, the physical layer generating a HARQ ending signal and transmitting it to the MAC layer; and the MAC layer driving an ARQ retransmission timer for the packet in response to the HARQ ending signal.

According to another aspect of the present invention, there is provided a method of changing the state of an ARQ (Automatic Repeat reQuest) of a MAC (Media Access Control) layer in a wireless communication system, the method including changing from a not sent state to a wait for HARQ (Hybrid ARQ) end state during transmission of a packet; determining whether a HARQ ending signal for the packet is generated in the wait for HARQ end state; and when the HARQ ending signal is generated, changing from the wait for HARQ end state to an outstanding state in order to drive a predetermined ARQ retransmission timer.

According to another aspect of the present invention, there is provided a transmitting apparatus of a wireless communication system, the apparatus including a physical layer unit generating a HARQ (Hybrid Automatic Repeat reQuest) ending signal when HARQ transmission of a packet is discontinued; and a MAC (Media Access Control) layer unit driving an ARQ retransmission timer for the packet when the HARQ ending signal is generated.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail when it is determined that they would obscure the invention in unnecessary detail. The specific terms used in the present disclosure are determined in consideration of the functions of the present invention, and therefore may be changed according to the intention of a user or an operator or conventional usage. Therefore, the specific terms must be understood based on the present disclosure.

The present invention provides a method of preventing a Media Access Control (MAC) layer from unnecessarily retransmitting data, and retransmitting data at high speeds when a base station and a user terminal establish communication using an Automatic Repeat reQuest (ARQ) of the MAC layer and a Hybrid ARQ (HARQ) of a physical layer in a Baseband Wireless Access (BWA) communication system.

Hereinafter, the present invention will be described with respect to a BWA communication system employing Orthogonal Frequency Division Multiplexing (OFDM) or Orthogonal Frequency Division Multiple Access (OFDMA), but the present invention is not limited thereto. The present invention can be applied to various communication systems, such as a Code Division Multiple Access (CDMA)-based communication system.

Figure 1:
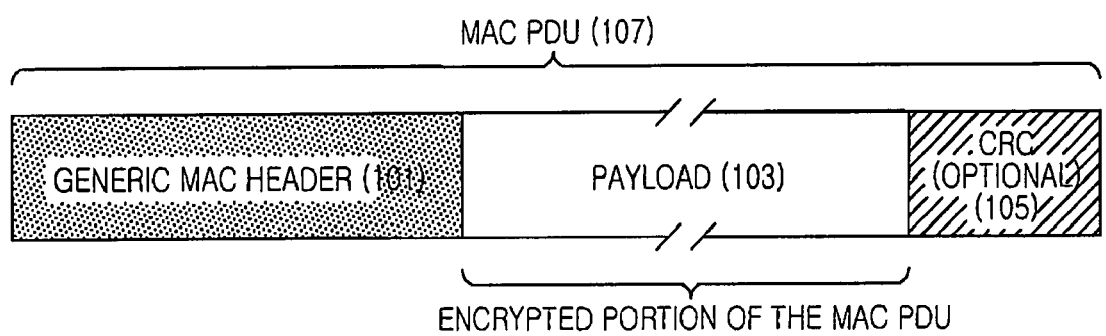
FIG. 1 illustrates the format of a Packet Data Unit (PDU) of a MAC layer in a conventional Baseband Wireless Access (BWA) communication system.
Figure 2:
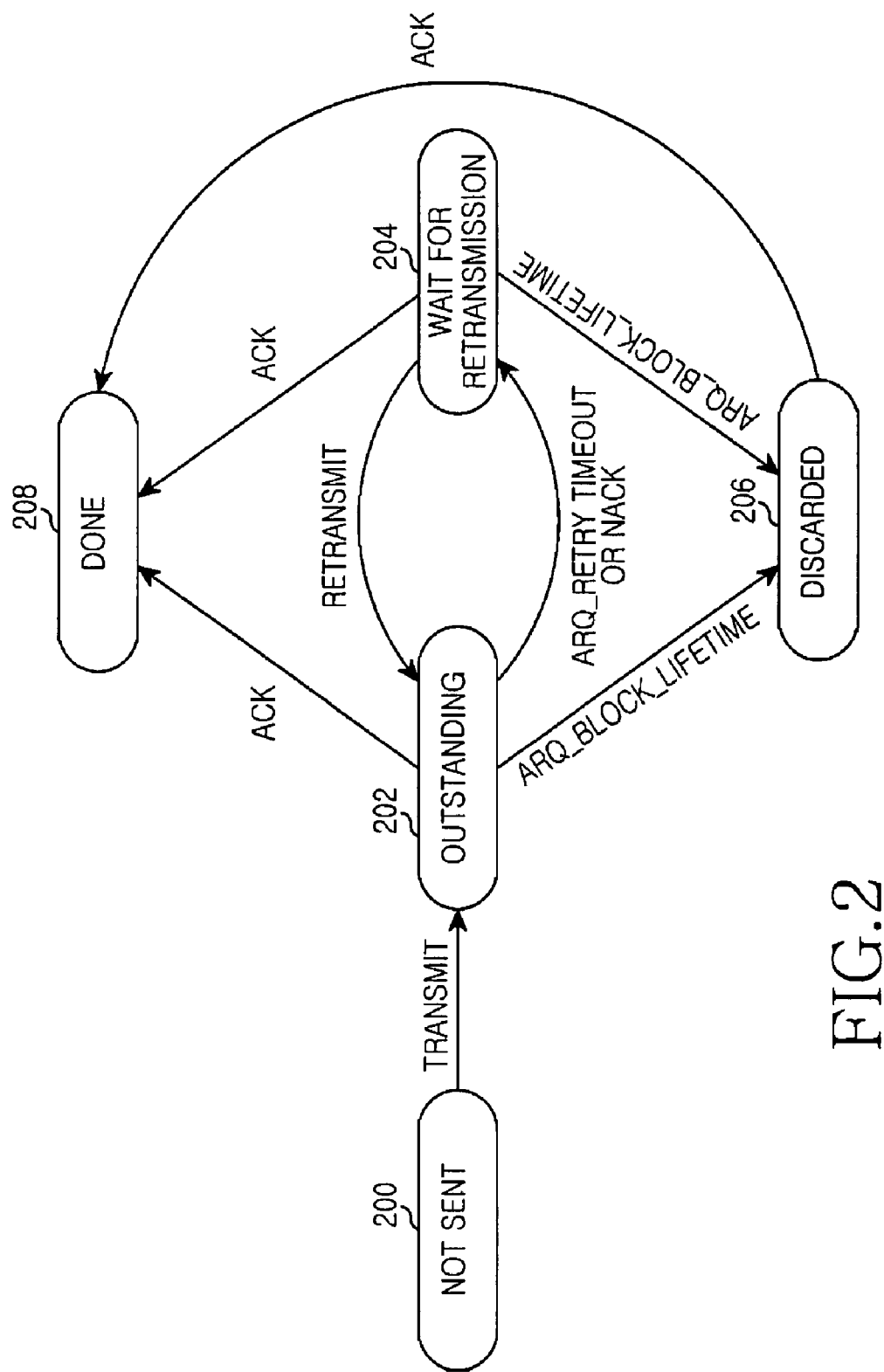
FIG. 2 is a state transition diagram of an Automatic Repeat reQuest (ARQ) of a MAC layer in a conventional BWA communication system.
Figure 3:
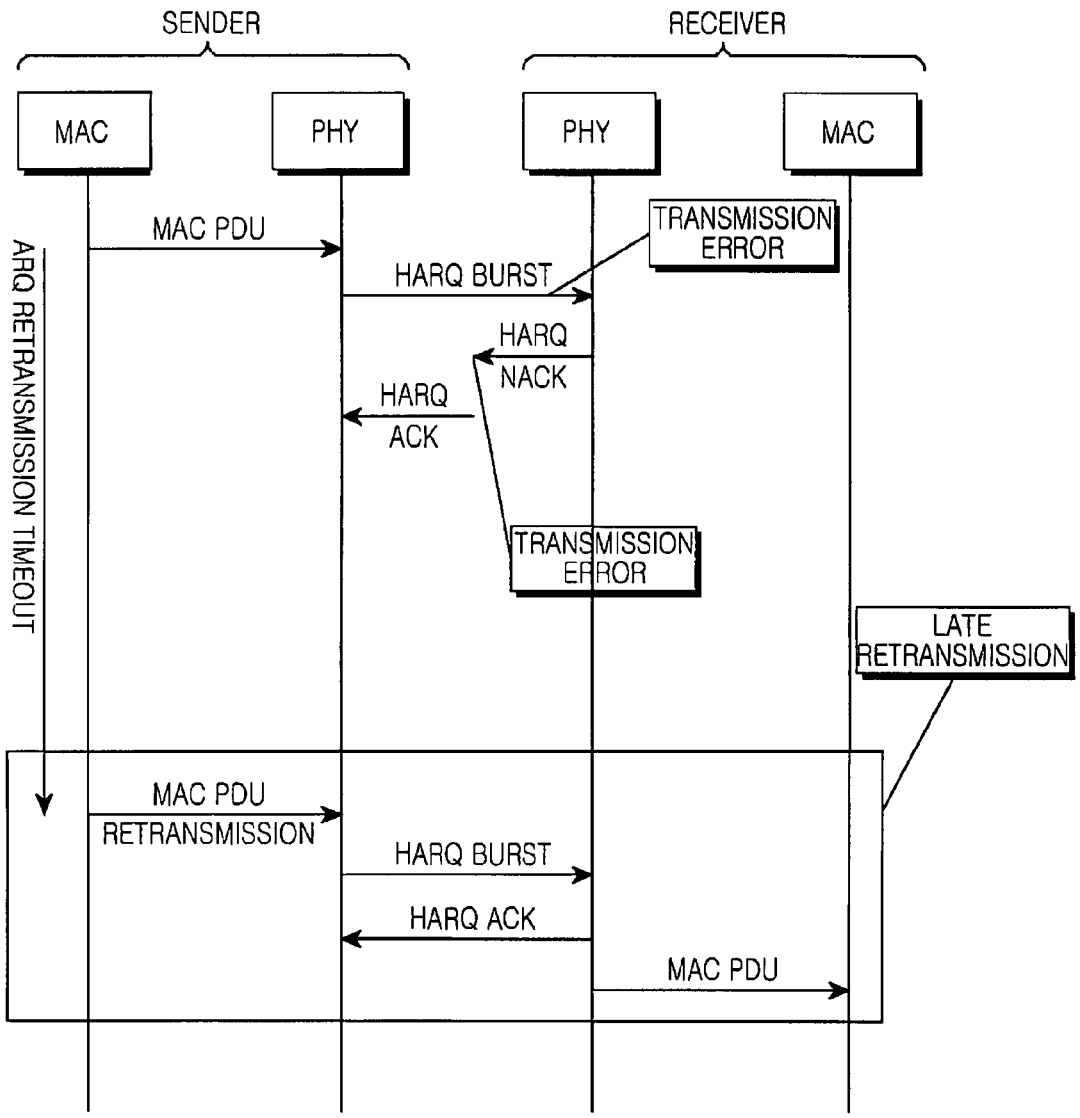
FIG. 3 is a flow diagram illustrating a conventional case where data retransmission is delayed due to an ARQ retransmission timer of a MAC layer.
Figure 4:
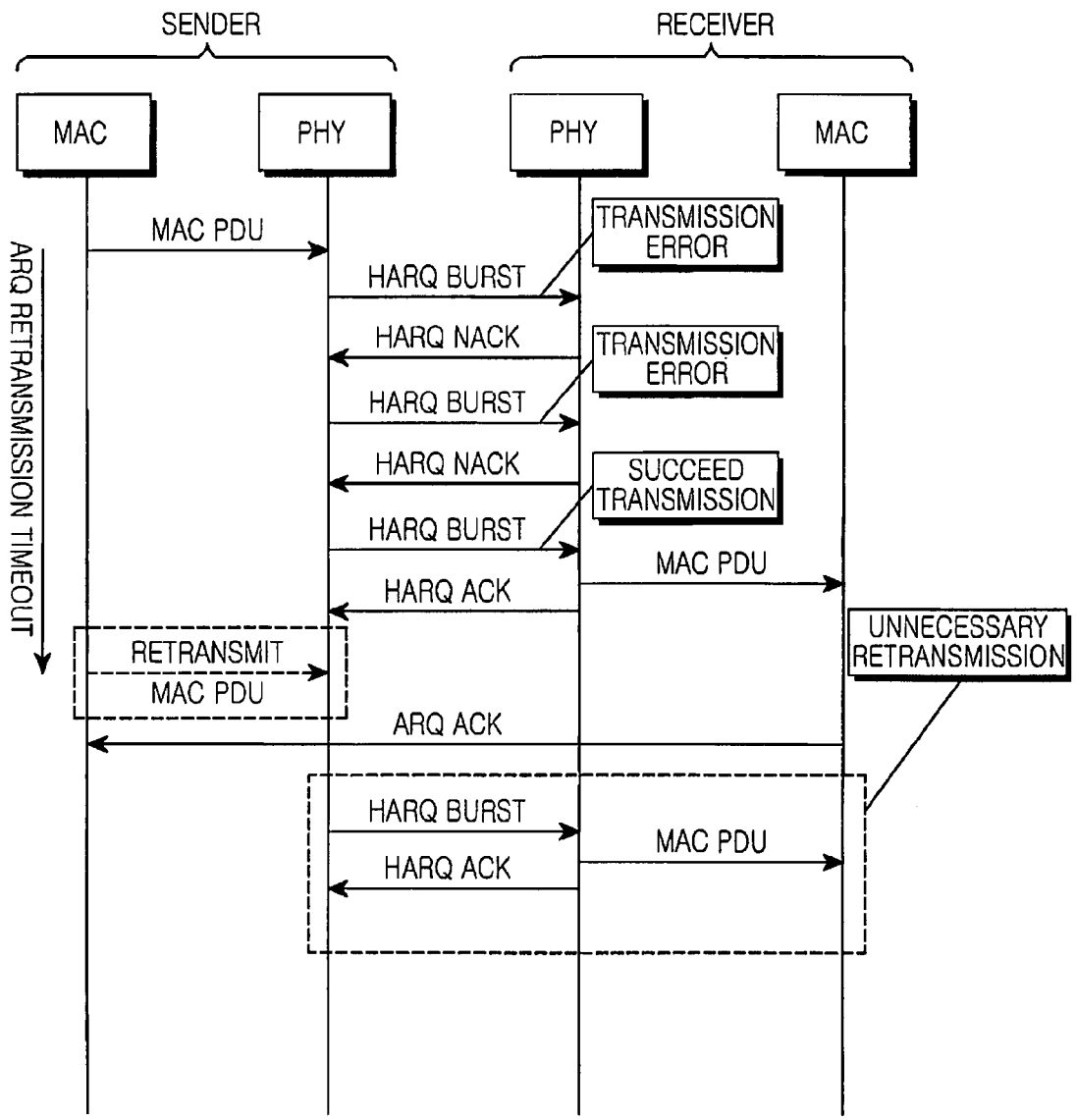
FIG. 4 is a flow diagram illustrating a conventional case where data is unnecessarily retransmitted due to an ARQ retransmission timer of a MAC layer.
Figure 5:
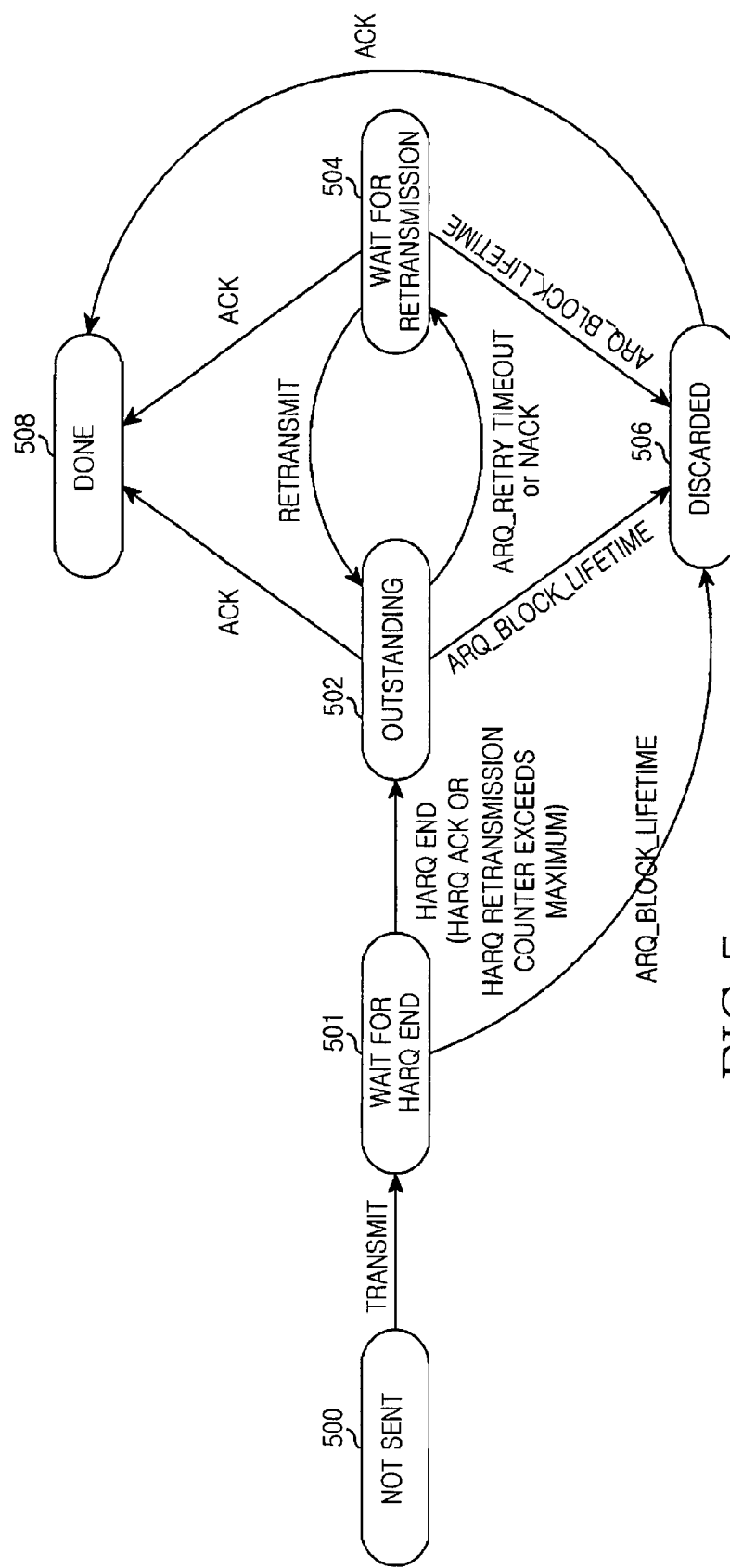
FIG. 5 is a state transition diagram of an ARQ of a MAC layer in a BWA communication system according to the present invention.

FIG. 5 is a state transition diagram of an ARQ of a MAC layer in a BWA communication system, according to the present invention.

As illustrated in FIG. 5, the states of the ARQ of the MAC layer include a "not sent" state 500, a "wait for HARQ end" state 501, an "outstanding" state 502, a "wait for retransmission" state 504, a "discarded" state 506, and a "done" state 508.

Referring to FIG. 5, first, when a packet (MAC PDU) is transmitted in the "not sent" state 500, the MAC layer transmits to the "wait for HARQ end" state 501. In the "wait for HARQ end" state 501, the MAC layer stands by to receive a HARQ ending signal generated by a physical layer. Here, the HARQ ending signal is generated by the physical layer and transmitted to the MAC layer when a HARQ ACK signal is received from a receiver or when a number of times that a HARQ has been retransmitted reaches a predetermined value.

If a predetermined lifetime ARQ_BLOCK_LIFETIME expires in the "wait for HARQ end" state 501, the MAC layer transmits to the "discarded" state 506 so as to discard the packet. If the HARQ ending signal is received from the physical layer, the MAC layer transmits from the "wait for HARQ end" state 501 to the "outstanding" state 502, and drives a predetermined ARQ retransmission timer.

If a NACK signal is received or the ARQ retransmission timer expires in the "outstanding" state 502, the MAC layer transmits to the "wait for retransmission" state 504. The MAC layer that transmits to the "wait for retransmission" state 504, retransmits the packet and transmits to the "outstanding" state 502.

If an ACK message is received from the receiver in the "wait for retransmission" state 504, the MAC layer transmits to the "done" state 508 in order to discontinue transmission of the packet. When retransmission fails continuously and the lifetime ARQ_BLOCK_LIFETIME expires, the MAC layer transmits to the "discarded" state 506 in order to discard the packet.

If the ACK message is received from the receiver in the "outstanding" state 502, the MAC layer transmits to the "done" state 508. Also, if the lifetime ARQ_BLOCK_LIFETIME expires in the "outstanding" state 502, the MAC layer transmits to the "discarded" state 506 in order to discard the packet. Also, when the ACK message is received from the receiver in the "discarded" state 506, the MAC layer transmits to the "done" state 508.

As described above, according to the present invention, an ARQ retransmission timer of a MAC layer is driven at a point of time when a HARQ ends, thereby preventing a MAC PDU from being unnecessarily retransmitted due to the expiration of the ARQ retransmission timer during retransmission of the HARQ. Also, according to the present invention, there is no need to reflect a transmission delay of the HARQ when setting the ARQ retransmission timer. Accordingly, the ARQ retransmission timer can be set to be significantly short.

Figure 6:
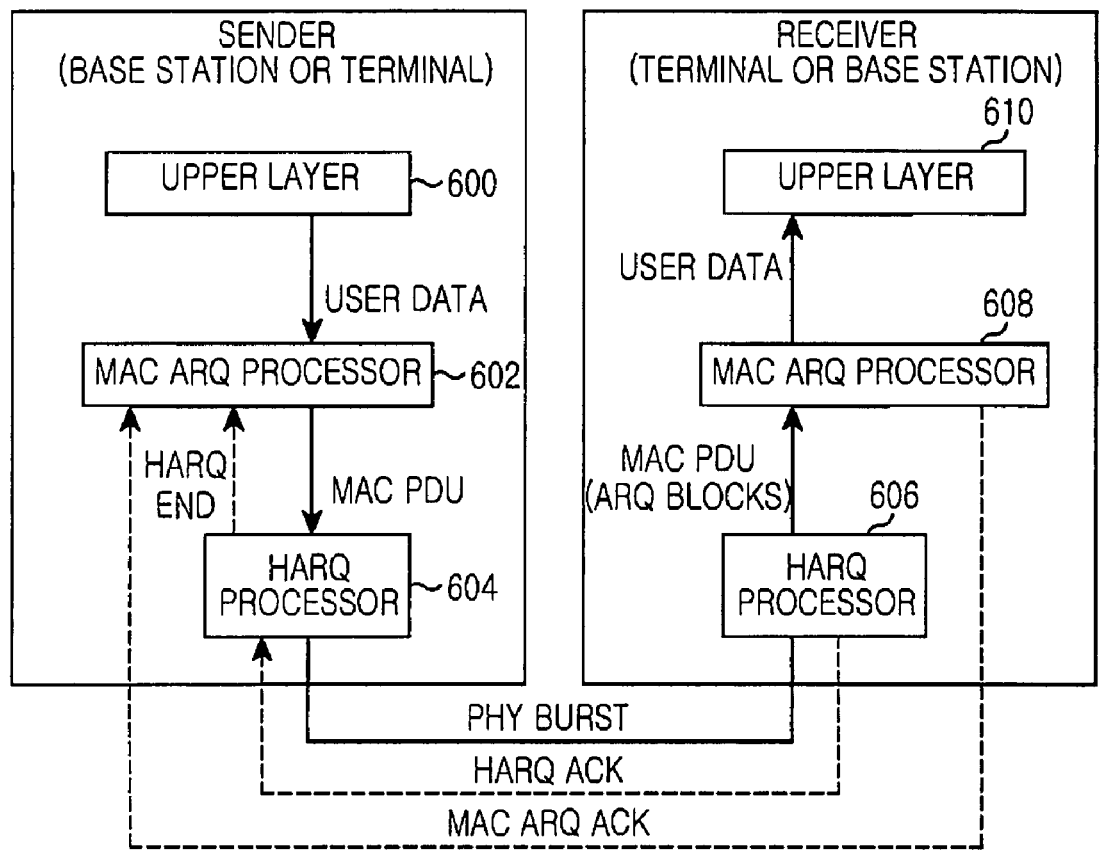
FIG. 6 is a block diagram of a sender and a receiver in a BWA communication system according to the present invention.

FIG. 6 is a block diagram of a sender and a receiver in a BWA communication system, according to the present invention. Hereinafter, the sender and the receiver are relative concepts, and thus, both a terminal and a base station can act as the sender or the receiver, depending on whether they receive or transmit data.

Referring to FIG. 6, each of the sender and the receiver largely includes three protocol layers. A protocol stack is generally divided into an upper layer, a MAC layer, and a physical layer PHY. Here, the MAC layer includes MAC ARQ processors 602 and 608 that process retransmission functions, and the physical layer includes HARQ processors 604 and 606 that process retransmission functions.

First, in the case of the sender, the MAC layer makes a MAC PDU using user data received from the upper layer, and transmits it to the physical layer. Then, the physical layer creates a HARQ burst by collecting MAC PDUs received from the MAC layer, modulates the HARQ burst in a format that can be actually transmitted, and transmits it to the receiver. Here, the HARQ burst may be a physical layer packet that is obtained using a combination of channel coding and the retransmission technique (ARQ).

During transmission, the HARQ processor 604 controls retransmission of the packet according to a HARQ ACK signal fed back from the receiver. When a negative response HARQ-NACK is received from the physical layer of the receiver, the HARQ processor 604 retransmits the packet (HARQ burst). When a positive response HARQ-ACK is received from the physical layer of the receiver or when a number of times that the HARQ has been retransmitted reaches a predetermined value, the HARQ processor 604 transmits the HARQ ending signal to the MAC ARQ processor 602.

Then, the MAC ARQ processor 602 drives an ARQ retransmission timer in response to the HARQ ending signal. When a positive response ARQ-ACK is received from the MAC layer of the receiver during the driving of the ARQ retransmission timer, control of retransmission of the packet (MAC PDU) is terminated. When a negative response ARQ-NACK is received from the receiver during driving of the ARQ retransmission timer or when the ARQ retransmission timer expires, the packet (MAC PDU) is retransmitted.

In the case of the receiver, the physical layer demodulates a signal received wirelessly and translates it into a HARQ burst, and transmits MAC PDUs contained in the HARQ burst to an upper MAC layer. Then, the MAC layer extracts user data from the MAC PDUs received from the physical layer, and transmits it to the upper layer.

During reception, the HARQ processor 606 determines whether an error has occurred in the received HARQ burst. For the determination, a Cyclic Redundancy Check (CRC) may be performed. If it is determined that an error has occurred, a negative response HARQ-NACK is transmitted to the physical layer of the sender. If it is determined that an error has not occurred, a positive response HARQ-ACK is transmitted to the physical layer of the sender and the received MAC PDU is transmitted to the MAC layer.

Also, the MAC ARQ processor 608 determines whether an error has occurred in the MAC PDU received from the physical layer. When it is determined that an error has occurred, a negative response ARQ-NACK is transmitted to the MAC layer of the sender. When it is determined that an error has not occurred, a positive response ARQ-ACK is transmitted to the MAC layer of the sender.

Figure 7:
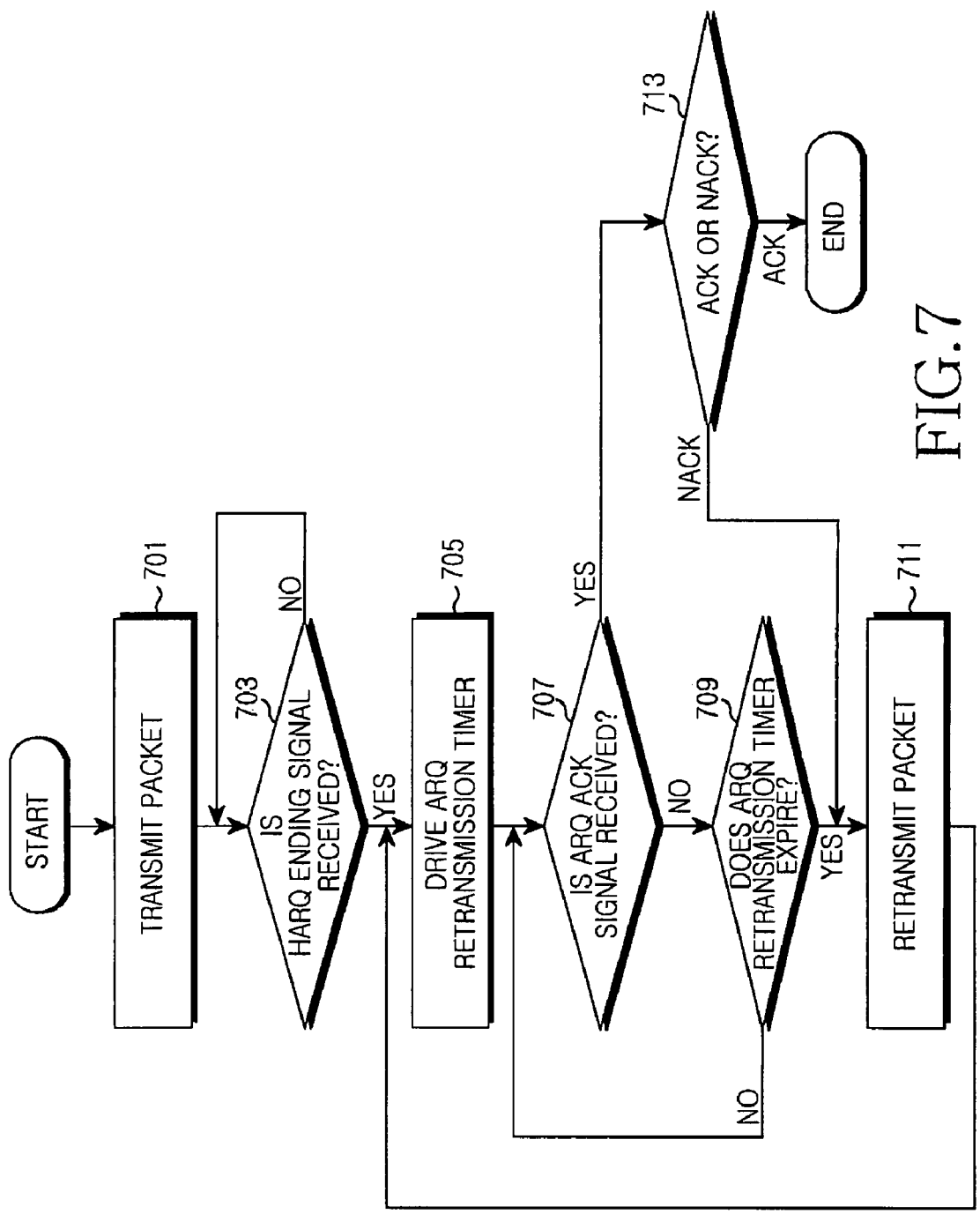
FIG. 7 is a flowchart illustrating the operation of a MAC layer of a sender in a BWA communication system according to the present invention.

FIG. 7 is a flowchart illustrating the operation of a MAC layer of a sender in a BWA communication system, according to the present invention.

Referring to FIG. 7, first, the MAC layer of the sender generates a MAC PDU from user data received from an upper layer, and transmits it to a lower physical layer, in step 701. Next, the MAC layer determines whether a HARQ ending signal is received from the physical layer, in step 703. Here, the HARQ ending signal is generated by the physical layer and transmitted to the MAC layer when a HARQ ACK signal is received from a receiver or when a number of times that a HARQ has been retransmitted reaches a predetermined value.

If the HARQ ending signal is received from the physical layer, the MAC layer proceeds to step 705 and drives a predetermined ARQ retransmission timer. After driving the ARQ retransmission timer, the MAC layer proceeds to step 707 and determines if an ARQ ACK signal is received from a MAC layer of the receiver.

If the ARQ ACK signal is received, the MAC layer proceeds to step 713, and determines whether the ARQ ACK signal is a positive response ARQACK or a negative response ARQNACK. If it is determined that the positive response ARQACK is received, the MAC layer ends control of retransmission of the packet (MAC PDU). If it is determined that the positive response ARQ ACK is received, the process ends. If it is determined that the negative response ARQNACK is received, the MAC layer proceeds to step 711 in order to retransmit the packet (MAC PDU), and returns to step 705.

If it is determined in step 707 that the ARQ ACK signal is not received, the MAC layer determines whether the ARQ retransmission timer has expired, in step 709. If the ARQ retransmission timer has not expired, the MAC layer returns to step 707 in order to determine whether the ARQ ACK signal is received. If the ARQ retransmission timer has expired, the MAC layer proceeds to step 711 so as to retransmit the packet (MAC PDU) and returns to step 705. If the retransmission of the packet (MAC PDU) continuously fails and a predetermined lifetime ARQ_BLOCK_LIFETIME ends, the packet (MAC PDU) is discarded.

Figure 8:
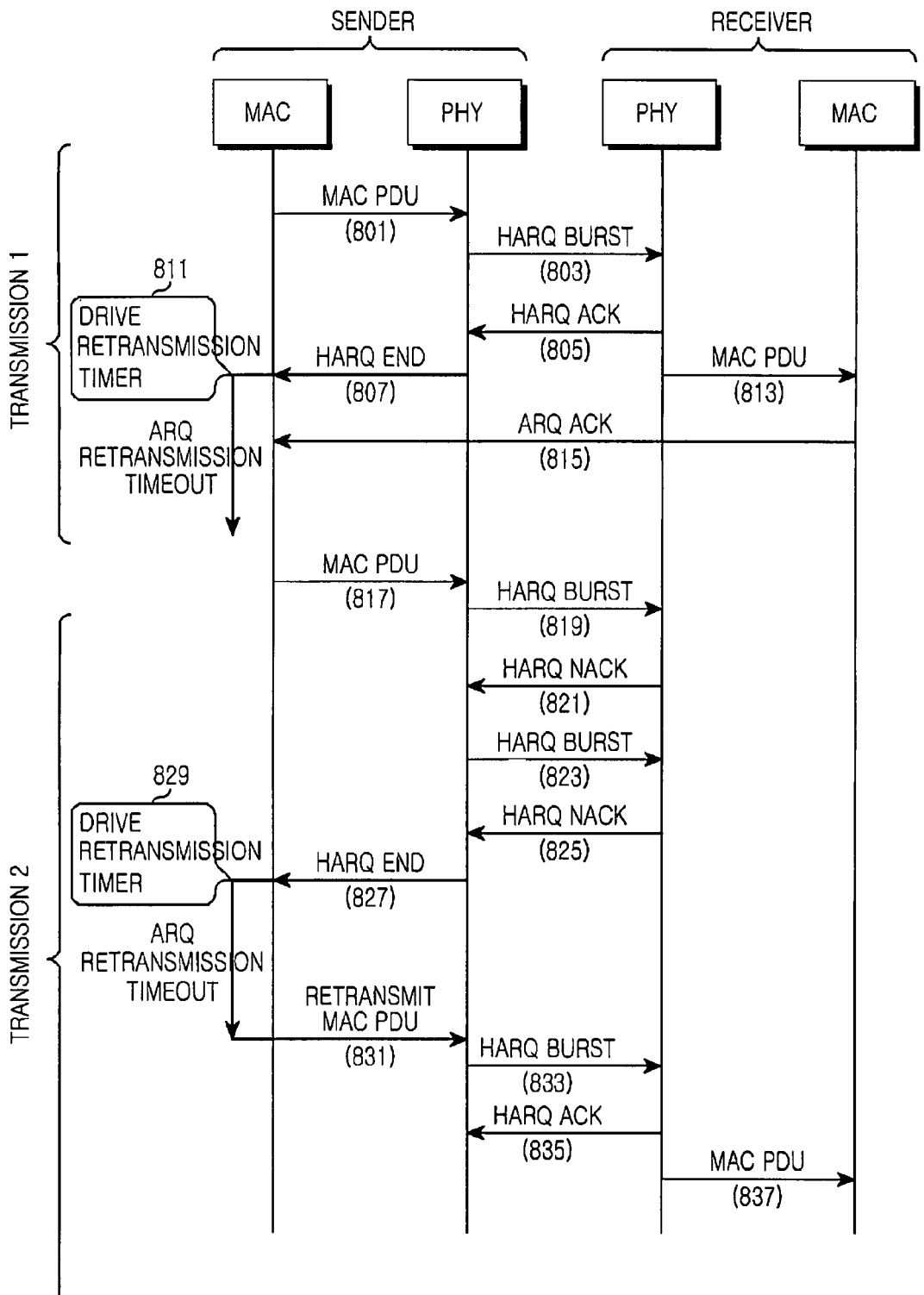
FIG. 8 is a flow diagram illustrating exchange of signals between a sender and a receiver in a BWA communication system according to the present invention.

FIG. 8 illustrates exchange of signals between a sender and a receiver in a BWA communication system, according to the present invention.

First, in the case of transmission 1, a MAC layer of the sender creates MAC PDUs and transmits them to a physical layer, in step 801. Then, the physical layer generates a HARQ burst using the MAC PDUs received from the MAC layer, and transmits it to the receiver, in step 803.

Next, the physical layer of the receiver determines whether an error has occurred in the received HARQ burst, and transmits a positive response HARQACK to the sender when it is determined that an error has not occurred, in step 805. Then, the physical layer of the sender receiving the positive response HARQACK determines that the packet is normally transmitted, and generates a HARQ ending signal and transmits it to a MAC layer of the sender, in step 807. The MAC layer of the sender receiving the HARQ ending signal drives an ARQ retransmission time, in step 811.

When it is determined that the received HARQ burst is normal, the physical layer of the receiver transmits the MAC PDUs contained in the received HARQ burst to the MAC layer of the receiver, in step 813. Then, the MAC layer of the receiver determines whether an error has occurred in the MAC PDUs received from the physical layer, and transmits a positive response ARQACK to the sender MAC layer when it is determined that an error has not occurred, in step 815.

If a positive response ARQACK is received from the receiver before the expiration of the ARQ retransmission timer as illustrated in FIG. 8, the MAC layer of the sender ends control of retransmission of the MAC PDUs.

Next, in the case of transmission 2, the MAC layer of the sender creates MAC PDUs and transmits them to the physical layer, in step 817. Then, the physical layer creates a HARQ burst using the MAC PDUs received from the MAC layer, and transmits it to the receiver, in step 819.

Next, the physical layer of the receiver determines whether an error has occurred in the received HARQ burst, and transmits a negative response HARQNACK to the sender when it is determined that an error has occurred, in step 821. The physical layer of the sender that receives the negative response HARQNACK retransmits the HARQ burst, in step 823. Next, the physical layer of the receiver determines whether an error has occurred in the retransmitted HARQ burst, and transmits a negative response HARQNACK to the sender when it is determined that an has error occurred, in step 825.

If a number of times that the HARQ burst has been retransmitted reaches a predetermined value, the physical layer of the sender completes retransmission of the HARQ burst, and generates a HARQ ending signal and transmits it to the MAC layer of the sender, in step 827. When receiving the HARQ ending signal, the MAC layer of the sender drives an ARQ retransmission timer, in step 829.

If an ARQ ACK signal is not received from the MAC layer of the receiver until the expiration of the ARQ retransmission timer, the MAC layer of the sender retransmits the packets (MAC PDUs) to the physical layer, in step 831. Then, the physical layer of the sender creates a HARQ burst using the MAC PDUs received from the MAC layer, and transmits it to the receiver, in step 833.

Next, the physical layer of the receiver determines whether an error occurs in the received HARQ burst, and transmits a positive response HARQACK to the sender when it is determined that an error has not occurred, in step 835. Also, the physical layer of the receiver transmits the MAC PDUs contained in the received HARQ burst to the MAC layer of the receiver, in step 837.

As described above, according to the present invention, since an ARQ retransmission timer of a MAC layer is driven after transmission of a HARQ is completed, the ARQ retransmission timer can be set to be short. That is, it is possible to retransmit data at the MAC layer at high speeds.

Figure 9:
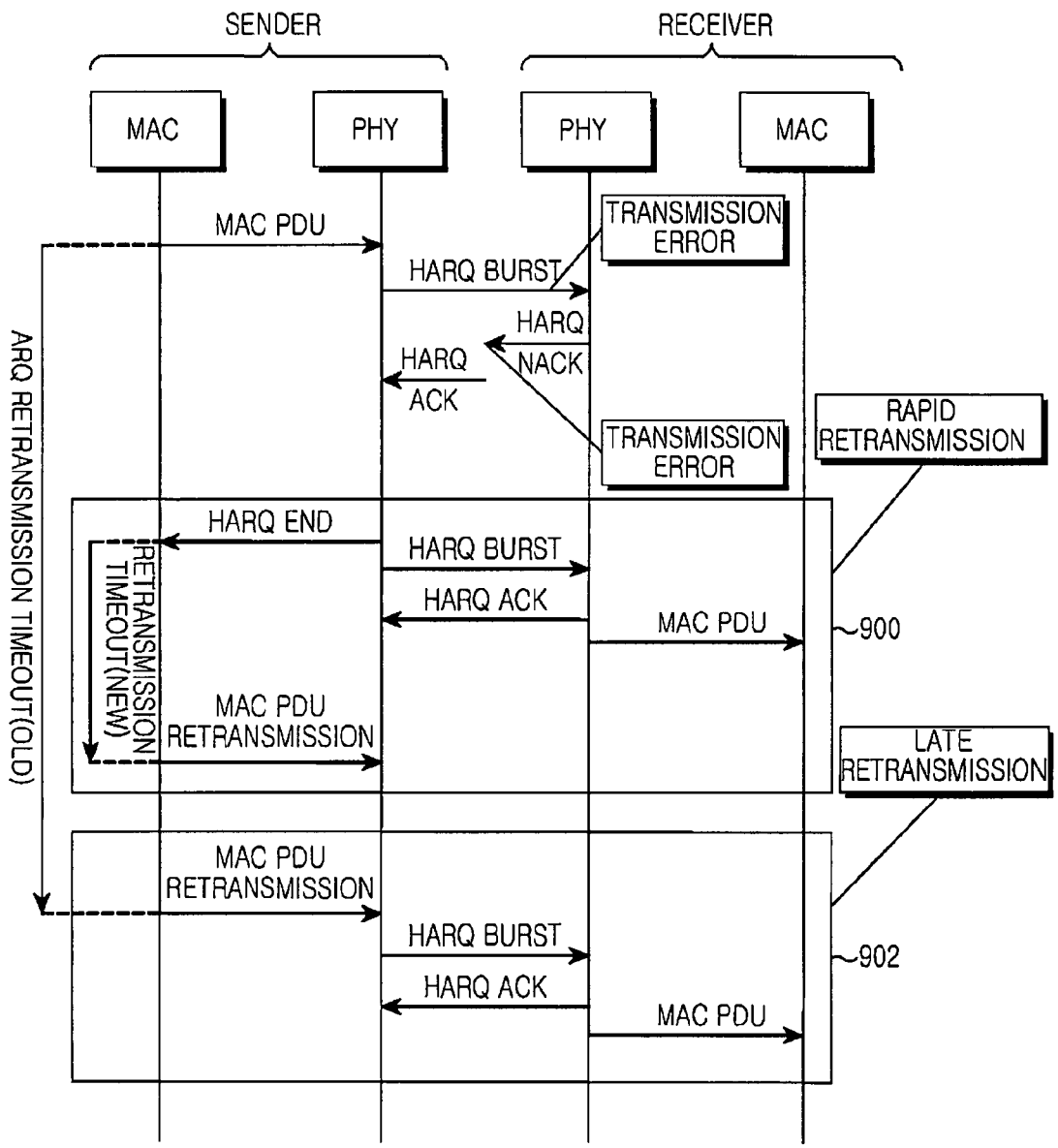
FIG. 9 is a flow diagram comparing a method of using an ARQ according to the present invention with a conventional method of using an ARQ.

FIG. 9 is a diagram comparing a method of using an ARQ according to the present invention with a conventional method of using an ARQ.

As illustrated in FIG. 9, according to the present invention, an ARQ retransmission timer of a MAC layer is driven after transmission of a HARQ at a physical layer is completed. If no ARQ ACK signal is received from a receiver until the expiration of the ARQ retransmission timer, a packet (MAC PDU) is retransmitted to the receiver. Here, the ARQ retransmission timer can be set to be short since a transmission delay of the HARQ need not be considered. That is, the present invention is advantageous in that even if an error occurs during transmission of the HARQ, the MAC layer is capable of rapidly retransmitting the packet (MAC PDU) as indicated with reference numeral 900.

In contrast, according to the conventional method, an ARQ retransmission timer is driven simultaneously with transmission of a MAC PDU. Here, the ARQ retransmission timer is set to be significantly long since it is determined in consideration of a transmission delay of the HARQ. Thus, according to the conventional method, when an error occurs during transmission of the HARQ, a packet is retransmitted after the expiration of the ARQ retransmission timer as indicated with reference numeral 902. Therefore, retransmission of the packet at the MAC layer is significantly delayed.

Figure 10:
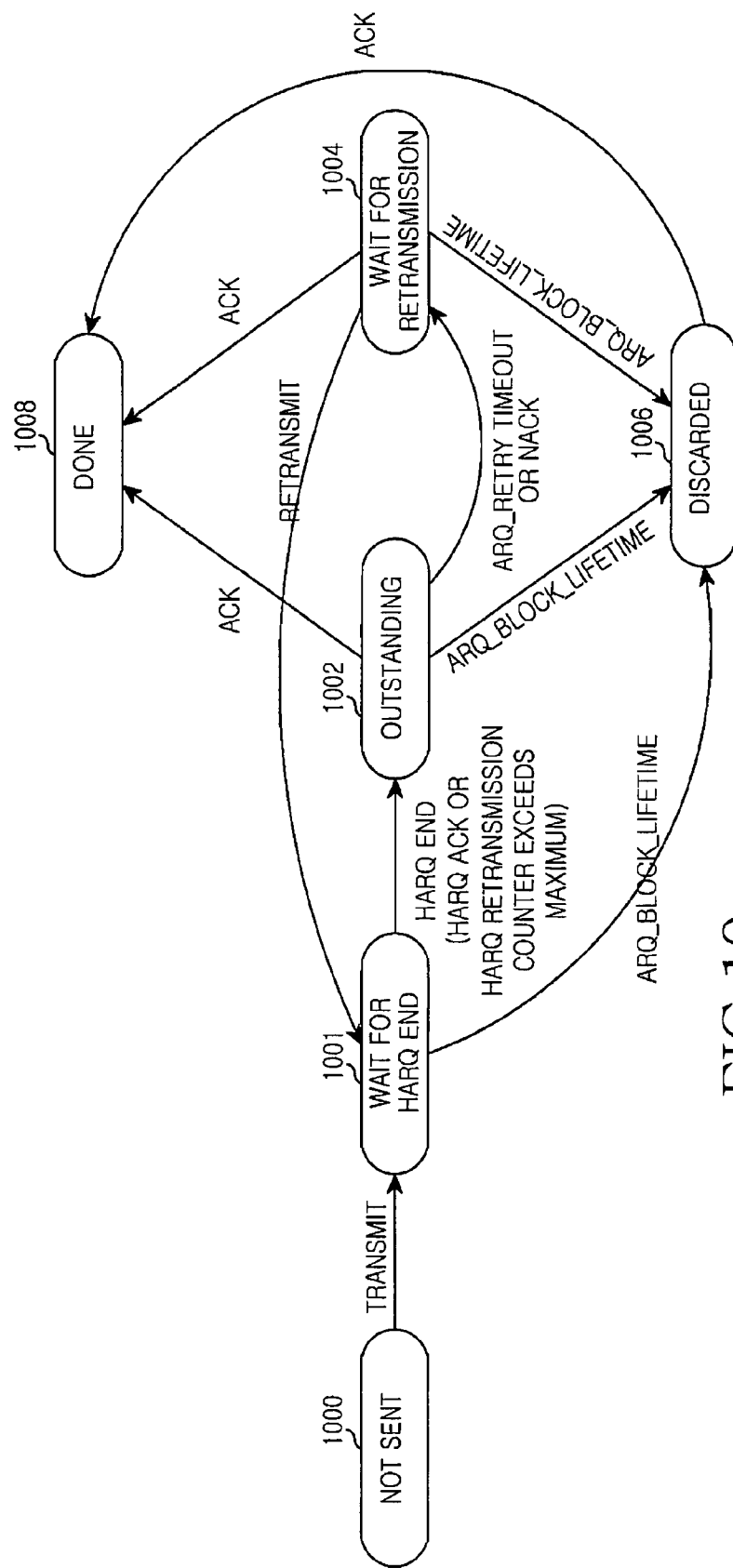
FIG. 10 is a state transition diagram of an ARQ of a MAC layer in a BWA communication system according to the present invention.

FIG. 10 is a state transition diagram of an ARQ of a MAC layer in a BWA communication system, according to the present invention.

As illustrated in FIG. 10, the states of the ARQ of the MAC layer include a "not sent" state 1000, a "wait for HARQ end" state 1001, an "outstanding" state 1002, a "wait for retransmission" state 1004, a "discarded" state 1006, and a "done" state 1008.

Referring to FIG. 10, first, when a packet (MAC PDU) is transmitted in the "not sent" state 1000, the MAC layer transmits to the "wait for HARQ end" state 1001. The MAC layer stands by to receive a HARQ ending signal generated by a physical layer in the "wait for HARQ end" state 1001. Here, the HARQ ending signal is generated by the physical layer and transmitted to the MAC layer when a HARQ ACK signal is received from a receiver or when a number of times that a HARQ has been retransmitted reaches a predetermined value.

If a predetermined lifetime ARQ_BLOCK_LIFETIME expires in the "wait for HARQ end" state 1001, the MAC layer transmits to the "discarded" state 1006 so as to discard the packet. When receiving the HARQ ending signal from the physical layer, the MAC layer transmits from the "wait for HARQ end" state 1001 to the "outstanding" state 1002 in order to drive a predetermined ARQ retransmission timer.

If a NACK message is received from the receiver or the ARQ retransmission timer expires in the "outstanding" state 1002, the MAC layer transmits to the "wait for retransmission" state 1004. The MAC layer that transmits to the "wait for retransmission" state 1004 retransmits the packet (MAC PDU), and transmits to the "wait for HARQ end" state 1001 again in order to stand by to receive a HARQ ending signal generated by the physical layer.

If an ACK message is received from the receiver in the "wait for retransmission" state 1004, the MAC layer transmits to the "done" state 1008 in order to end transmission of the packet. When retransmission of the packet continuously fails and the lifetime ARQ_BLOCK_LIFETIME expires, the MAC layer transmits to the "discarded" state 1006 in order to discard the packet.

If an ACK message is received from the receiver in the "outstanding" state 1002, the MAC layer transmits to the "done" state 1008. Also, if the lifetime ARQ_BLOCK_LIFETIME expires in the "outstanding" state 1002, the MAC layer transmits to the "discarded" state 1006 in order to discard the packet. Also, if an ACK message is received from the receiver in the "discarded" state 1006, the MAC layer transmits to the "done" state 1008.

According to the embodiment of the present invention in FIG. 10, the MAC layer retransmits the packet in the "wait for retransmission" state 1004 and transmits again to the "wait for HARQ end" state 1001. Accordingly, it is possible to prevent MAC PDUs from being unnecessarily retransmitted not only during initial transmission of the HARQ but also during retransmission of the HARQ.

Figure 11:
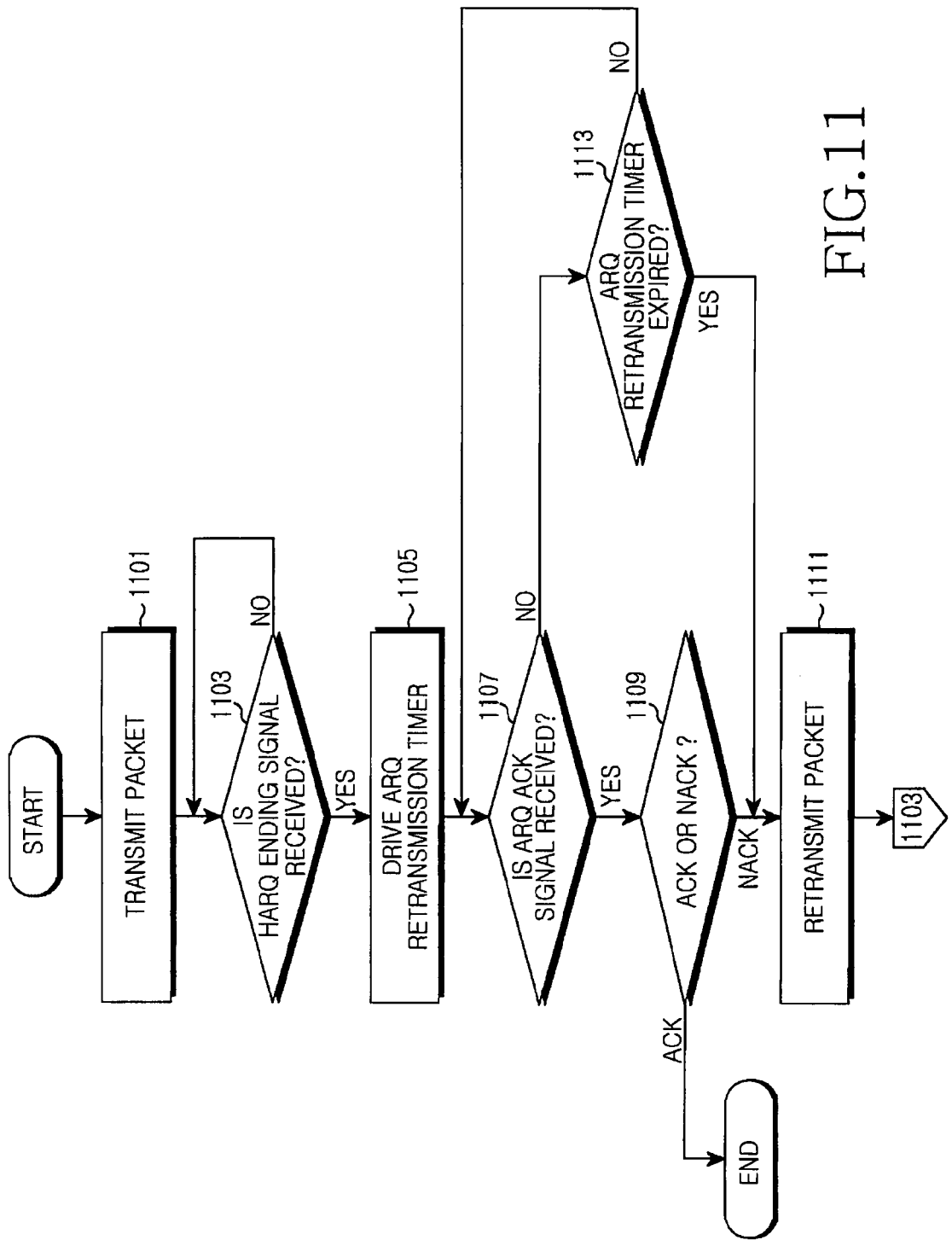
FIG. 11 is a flowchart illustrating the operation of a MAC layer of a sender in a BWA communication system according to the present invention.

FIG. 11 is a flowchart illustrating the operation of a MAC layer of a sender in a BWA communication system, according to the present invention.

Referring to FIG. 11, first, the MAC layer of the sender generates MAC PDUs using user data received from an upper layer, and transmits them to a lower physical layer, in step 1101. Next, the MAC layer determines whether a HARQ ending signal is received from the physical layer, in step 1103. Here, the HARQ ending signal is generated by the physical layer and transmitted to the MAC layer when a HARQ ACK signal is received from the receiver or when a number of times that a HARQ has been retransmitted reaches a predetermined value.

In this case, when the HARQ signal is received from the physical layer, the MAC layer proceeds to step 1105 and drives a predetermined ARQ retransmission timer. After driving the ARQ retransmission timer, the MAC layer proceeds to step 1107 and determines whether an ARQ ACK signal is received from the MAC layer of the receiver.

If the ARQ ACK signal is not received in step 1107, the MAC layer proceeds to step 1113 and determines whether the ARQ retransmission timer has expired. When it is determined that the ARQ retransmission timer has not expired, the MAC layer returns to step 1107 in order to determine whether the ARQ ACK signal is received. If it is determined that the ARQ retransmission timer has expired, the MAC layer proceeds to step 1111 in order to retransmit the packet, and then returns to step 1103 in order to determine whether a HARQ ending signal regarding the retransmitted packet is received from the physical layer.

If it is determined in step 1107 that the ARQ ACK signal is received, the MAC layer proceeds to step 1109 and determines whether the ARQ ACK signal is a positive response ARQACK or a negative response ARQNACK. If it is determined that the positive response is received, the MAC layer ends control of retransmission of the packet (MAC PDU). If it is determined that the negative response is received, the MAC layer proceeds to step 1111 in order to retransmit the packet, and returns to step 1103 in order to perform the operations following step 1103 again.

As described above, according to the present invention, an ARQ retransmission timer of a MAC layer is driven after transmission of a HARQ is completed, and therefore, it is possible to prevent the MAC layer from unnecessarily performing data retransmission due to the expiration of the ARQ retransmission timer during the operation of the HARQ. Also, according to the present invention, the ARQ retransmission timer can be set to be short regardless of a number of times that the HARQ has been retransmitted. Therefore, even if an error has occurred during a HARQ operation of the physical layer, the MAC layer is capable of rapidly performing data retransmission.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A transmission method of a MAC (Media Access Control) layer in a wireless communication system, comprising:
   determining whether a HARQ (Hybrid Automatic Repeat reQuest) ending signal is generated by a physical layer after transmission of a packet, wherein the HARQ ending signal informs the MAC layer that transmission of a HARQ in the physical layer is completed; and
   driving, by a MAC layer unit, an ARQ retransmission timer for the packet when the HARQ ending signal is generated.

2. The transmission method of claim 1, wherein the HARQ ending signal is generated when a positive response for a HARQ burst that contains the packet is received or when a number of times that a HARQ has been retransmitted reaches a predetermined value.

3. The transmission method of claim 1, further comprising retransmitting the packet when a response signal for the packet is not received until the ARQ retransmission timer expires.

4. The transmission method of claim 1, further comprising retransmitting the packet when a negative response for the packet is received during the driving of the ARQ retransmission timer.

5. The transmission method of claim 1, further comprising discarding the packet when a positive response for the packet is not received until a lifetime of the packet expires.

6. The transmission method of claim 1, wherein the packet is one of an initially transmitted packet and a retransmitted packet.

7. A transmission method of a wireless communication system, comprising:
   generating a packet in a Media Access Control (MAC) layer and transmitting the packet to a physical layer;
   creating a Hybrid Automatic Repeat reQuest (HARQ) burst in the physical layer using the packet received from the MAC layer, and transmitting the HARQ burst;
   when HARQ transmission for the packet is completed, generating a HARQ ending signal in the physical layer and transmitting it to the MAC layer, wherein the HARQ ending signal informs the MAC layer that transmission of the HARQ burst in the physical layer is completed; and
   driving, by a MAC layer unit, an ARQ retransmission timer for the packet in the MAC layer in response to the HARQ ending signal.

8. The transmission method of claim 7, wherein the HARQ ending signal is generated when a positive response for a HARQ burst that contains the packet is received or when a number of times that a HARQ has been retransmitted reaches a predetermined value.

9. The transmission method of claim 7, further comprising retransmitting the packet in the MAC layer when a response signal for the packet is not received until the ARQ retransmission timer expires.

10. The transmission method of claim 7, further comprising retransmitting the packet in the MAC layer when a negative response for the packet is received during the driving of the ARQ retransmission timer.

11. The transmission method of claim 7, further comprising discarding the packet when a positive response for the packet is not received until a lifetime of the packet expires.

12. The transmission method of claim 7, wherein the packet is one of an initially transmitted packet and a retransmitted packet.

13. A method of changing the state of an ARQ (Automatic Repeat request) of a MAC (Media Access Control) layer in a wireless communication system, the method comprising:
   changing from a not sent state to a wait for HARQ (Hybrid ARQ) end state during transmission of a packet;
   determining whether a HARQ ending signal for the packet is generated in the wait for HARQ end state, wherein the HARQ ending signal informs the MAC layer that transmission of a HARQ in a physical layer is completed; and
   when the HARQ ending signal is generated, changing from the wait for HARQ end state to an outstanding state and driving, by a MAC layer unit, a predetermined ARQ retransmission timer.

14. The method of claim 13, further comprising changing to a wait for retransmission state in order to retransmit the packet and changing to the outstanding state again, when a response signal for the packet is not received until the ARQ retransmission timer expires or when a negative response for the packet is received.

15. The method of claim 14, further comprising changing to a done state in order to end transmission of the packet when a positive response for the packet is received in the wait for retransmission state, and changing to a discarded state in order to discard the packet when a lifetime of the packet expires.

16. The method of claim 13, further comprising changing to a wait for retransmission state in order to retransmit the packet and changing to the wait for HARQ end state again, when a response signal for the packet is not received until the ARQ retransmission timer expires or when a negative response for the packet is received.

17. The method of claim 16, further comprising changing to a done state in order to end transmission of the packet when a positive response for the packet is received in the wait for retransmission state, and changing to a discarded state in order to discard the packet when the lifetime of the packet expires.

18. The method of claim 13, further comprising changing to a done state in order to end transmission of the packet when a positive response for the packet is received in the outstanding state, and changing to a discarded state in order to discard the packet when a lifetime of the packet expires.

19. A transmitting apparatus of a wireless communication system, comprising:
   a physical layer unit generating a HARQ (Hybrid Automatic Repeat reQuest) ending signal when HARQ transmission of a packet is completed; and
   a MAC (Media Access Control) layer unit driving an ARQ retransmission timer for the packet when the HARQ ending signal is generated,
   wherein the HARQ ending signal informs the MAC layer unit that the HARQ transmission in a physical layer is completed.

20. The transmitting apparatus of claim 19, wherein the physical layer unit generates the HARQ ending signal when a positive response for a HARQ burst that contains the packet is received or when a number of times that a HARQ has been retransmitted reaches a predetermined value.

21. The transmitting apparatus of claim 19, wherein the MAC layer unit retransmits the packet when a response signal for the packet is not received until the ARQ retransmission timer expires or when a negative response for the packet is received.

22. The transmitting apparatus of claim 21, wherein the MAC layer unit determines whether a HARQ ending signal for the retransmitted packet is generated after the retransmission of the packet, and drives an ARQ retransmission timer for the retransmitted packet when the HARQ ending signal is generated.

23. The transmitting apparatus of claim 19, wherein the MAC layer unit discards the packet when a positive response for the packet is not received until a lifetime of the packet expires.

* * * * *